(12) United States Patent
Cain et al.

(10) Patent No.: US 11,261,722 B2
(45) Date of Patent: Mar. 1, 2022

(54) SYSTEMS AND METHODS FOR MONITORING COMPONENTS OF A WELL

(71) Applicant: BP Corporation North America, Inc., Houston, TX (US)

(72) Inventors: David Earl Cain, Katy, TX (US); Jomon Joseph Kannala, Katy, TX (US); Michael Long Ge, Katy, TX (US); Daniel James Pickett, Katy, TX (US)

(73) Assignee: BP Corporation North America Inc., Houston, TX (US)

( * ) Notice: Subject to any disclaimer, the term of this patent is extended or adjusted under 35 U.S.C. 154(b) by 0 days.

(21) Appl. No.: 16/650,481

(22) PCT Filed: Sep. 27, 2018

(86) PCT No.: PCT/US2018/053190
§ 371 (c)(1),
(2) Date: Mar. 25, 2020

(87) PCT Pub. No.: WO2019/067765
PCT Pub. Date: Apr. 4, 2019

(65) Prior Publication Data
US 2021/0207471 A1 Jul. 8, 2021

Related U.S. Application Data

(60) Provisional application No. 62/565,504, filed on Sep. 29, 2017.

(51) Int. Cl.
*E21B 47/007* (2012.01)
*E21B 47/001* (2012.01)
(Continued)

(52) U.S. Cl.
CPC ............ *E21B 47/007* (2020.05); *E21B 17/01* (2013.01); *E21B 17/07* (2013.01); *E21B 19/006* (2013.01);
(Continued)

(58) Field of Classification Search
CPC ........ E21B 47/007; E21B 17/07; E21B 17/01; E21B 47/13; E21B 19/006; E21B 47/001; G01M 5/0041; G01M 5/0025
See application file for complete search history.

(56) References Cited

U.S. PATENT DOCUMENTS 6,869,254 B1 * 3/2005 Kershman ............. E21B 19/006
405/195.1
9,593,568 B1    3/2017 LeMonds et al.
(Continued)

FOREIGN PATENT DOCUMENTS

CN    102162769 A    8/2011
CN    202066671 U   12/2011
(Continued)

OTHER PUBLICATIONS

Phil Ward et al.: "Evaluation of Wellhead Fatigue Using In-Service Structural Monitoring Data (OTC 23981)", Offshore Technology Conference, May 6-9, Houston, Texas, USA; May 6, 2013 (May 6, 2013), pp. 1-13, XP055177393, DOI: 10.4043/23981-MS; ISBN: 978-1-61-399241-8, the whole document.
(Continued)

*Primary Examiner* — James G Sayre
(74) *Attorney, Agent, or Firm* — Conley Rose, P.C.

(57) ABSTRACT

A system for monitoring a condition of a component of a well system located proximate to a seabed includes a first sensor assembly to couple to a telescopic joint coupled to an upper end of a riser, wherein the first sensor assembly is configured to measure at least one of a vibration, an incli-
(Continued)

nation, and a strain in the riser, and a data processing system in signal communication with the first sensor assembly, wherein the data processing system is configured to estimate the condition of a subsea stack system based on measurements provided by the first sensor assembly.

23 Claims, 4 Drawing Sheets

(51) Int. Cl.
  *E21B 47/13* (2012.01)
  *E21B 17/01* (2006.01)
  *E21B 17/07* (2006.01)
  *E21B 19/00* (2006.01)
  *G01M 5/00* (2006.01)
(52) U.S. Cl.
  CPC ............ *E21B 47/001* (2020.05); *E21B 47/13* (2020.05); *G01M 5/0025* (2013.01); *G01M 5/0041* (2013.01)

(56) References Cited

U.S. PATENT DOCUMENTS

| | | | |
|---|---|---|---|
| 9,602,045 B2 | 3/2017 | Mebarkia et al. | |
| 2008/0128138 A1* | 6/2008 | Radi | E21B 47/001 166/350 |
| 2009/0255683 A1* | 10/2009 | Mouton | E21B 41/0014 166/355 |
| 2015/0142315 A1 | 5/2015 | Guzzo et al. | |
| 2015/0346064 A1 | 12/2015 | Liu et al. | |
| 2016/0084066 A1* | 3/2016 | DeBerry | E21B 17/085 166/336 |
| 2016/0160630 A1 | 6/2016 | Flight et al. | |
| 2017/0145810 A1 | 5/2017 | Deghuee | |

FOREIGN PATENT DOCUMENTS

| | | | | |
|---|---|---|---|---|
| CN | 105587308 A | | 5/2016 | |
| CN | 106351648 A | | 1/2017 | |
| EP | 2954155 B1 | | 6/2017 | |
| NO | 20150446 | * | 4/2015 | ........... E21B 19/006 |
| NO | 20150446 A1 | | 10/2016 | |
| WO | WO-0181164 A1 | * | 11/2001 | ........... E21B 19/006 |
| WO | 2009095655 A1 | | 8/2009 | |

OTHER PUBLICATIONS

Peter James Simpson et al.: "A System for Measuring Wellhead Bending Moments During Completion Operations"; Sep. 24, 2008 (Sep. 24, 2008), XP055124437, Retrieved from the Internet: URL:http://www.pulse-monitoring.com/assets/uploads/cms/files/111-64.pdf [retrieved on Jun. 20, 2014] pp. 1-6.
International Search Report dated Apr. 2, 2019, for Application No. PCT/US2018/053190.

* cited by examiner

SYSTEMS AND METHODS FOR MONITORING COMPONENTS OF A WELL

CROSS-REFERENCE TO RELATED APPLICATIONS

This application is a 35 U.S.C. § 371 national stage application of PCT/US2018/053190 filed Sep. 27, 2018, and entitled "Systems and Methods for Monitoring Components of a Well System, which claims benefit of U.S. provisional patent application Ser. No. 62/565,504 filed Sep. 29, 2017, and entitled "Systems and Methods for Monitoring Components of a Well System," both of which are hereby incorporated herein by reference in their entirety for all purposes.

STATEMENT REGARDING FEDERALLY SPONSORED RESEARCH OR DEVELOPMENT

Not applicable.

BACKGROUND

Offshore well systems for drilling and/or producing hydrocarbons from subsea wellbores are typically made up of components disposed at the waterline (e.g., a drilling vessel), components below the seabed (e.g., conductor, casing, etc.), components disposed at or near the seabed (e.g., a subsea stack system), and components extending between the surface and seabed (e.g., a riser system). Stresses experienced by the various components of the offshore well system during operation may result in fatigue. For example, wind, waves, subsea currents, and combinations thereof may induce damaging vibrations and loads to the riser and wellhead system. In order to evaluate components of the offshore well system, the condition of these components of the well system may be monitored during the service life of the offshore well system.

SUMMARY

An embodiment of a system for monitoring a condition of a component of a well system located proximate to a seabed comprises a surface vessel, a riser including an upper end coupled to the surface vessel and a lower end coupled to a subsea stack system, a telescopic joint coupled to the riser proximal the upper end of the riser, a first sensor assembly coupled to the telescopic joint, wherein the first sensor assembly is configured to measure at least one of a vibration, an inclination, and a strain in the riser, and a data processing system in signal communication with the first sensor assembly, wherein the data processing system is configured to estimate the condition of the subsea stack system based on measurements provided by the first sensor assembly. In some embodiments, the first sensor assembly is located above a waterline. In some embodiments, the telescopic joint comprises an inner barrel slidably disposed in an outer barrel, wherein the first sensor assembly is coupled to the outer barrel, wherein relative longitudinal movement between the outer barrel and the riser is restricted while relative longitudinal movement between the inner barrel and the riser is permitted, wherein the first sensor assembly is configured to measure a strain in the outer barrel. In certain embodiments, the system further comprises a vessel sensor assembly configured to measure one or more environmental conditions in the environment surrounding the well system, wherein the vessel sensor assembly is in signal communication with the data processing system, wherein the environmental conditions comprises at least one of a heave of the surface vessel, a wind velocity, a wave velocity, and a sea current velocity. In certain embodiments, the system further comprises a tensioning system coupled to the surface vessel and the riser, wherein the tensioning system is configured to apply an adjustable amount of tension to the riser, and a control system in signal communication with the data processing system, wherein the control system is configured to adjust the amount of tension applied to the riser from the tensioning system based on the environmental conditions measured by the vessel sensor assembly or the condition of the subsea stack system estimated by the data processing system. In some embodiments, the condition of the subsea stack system comprises a fatigue of the subsea stack system. In some embodiments, the system further comprises a wireless transmitter configured to wirelessly transmit electromagnetic signals representative of measurements provided by the first sensor assembly between the first sensor assembly and the data processing system. In certain embodiments, the first sensor assembly comprises an accelerometer, an inclinometer, and a strain gauge.

An embodiment of a system for monitoring a condition of a component of a well system located proximate to a seabed comprises a surface vessel, a riser including an upper end coupled to the surface vessel and a lower end coupled to a subsea stack system, a first sensor assembly coupled to the riser, wherein the first sensor assembly is configured to measure at least one of a vibration, an inclination, and a strain in the riser, a data processing system in signal communication with the first sensor assembly, wherein the data processing system is configured to estimate the condition of the subsea stack system based on measurements provided by the first sensor assembly, and a wireless transmitter configured to wirelessly transmit electromagnetic signals representative of measurements provided by the first sensor assembly between the first sensor assembly and the data processing system. In some embodiments, the wireless transmitter is configured to communicate signals between the first sensor assembly and the data processing system across a wireless local area network. In some embodiments, the system further comprises a second sensor assembly coupled to the subsea stack system and in signal communication with the data processing system, wherein the second sensor assembly is configured to measure a strain in the lower end of the riser. In certain embodiments, the data processing system is configured to estimate a strain in the riser based on the measurements provided by the first sensor assembly and measurements provided by the second sensor assembly. In certain embodiments, the system further comprises a tensioning system coupled to the riser, wherein the tensioning system is configured to apply an adjustable amount of tension to the riser, and a control system in signal communication with the data processing system, wherein the control system is configured to adjust, within a response time between five and fifteen minutes, the amount of tension applied to the riser by the tensioning system based on the strain in the riser as estimated by the data processing system. In some embodiments, the data processing system is configured to calibrate the estimation provided by the data processing system using the measurements provided by the second sensor assembly. In some embodiments, the system further comprises a telescopic joint coupled to the upper end of the riser, wherein the first sensor assembly is coupled to the telescopic joint. In certain embodiments, the first sensor assembly comprises an accelerometer, an inclinometer, and a strain gauge. In certain embodiments, the first sensor assembly comprises a data logger configured to store the measurements provided by the first sensor assembly.

An embodiment of a method for monitoring a condition of a component of a well system located proximate to a seabed comprises measuring at least one of a vibration, an inclination, and a strain in a riser using a first sensor assembly coupled to the riser, wirelessly transmitting electromagnetic signals representative of measurements provided by the first sensor assembly between the first sensor assembly and a data processing system, and using the data processing system to estimate the condition of a subsea stack system based on measurements provided by the first sensor assembly. In some embodiments, the method further comprises using the data processing system to estimate the condition of the riser based on the measurements provided by the first sensor assembly. In some embodiments, the method further comprises adjusting, within a response time between five and fifteen minutes, a tension applied to the riser from a tensioning system coupled to the riser in response to the estimated condition of the riser, wherein the condition of the riser estimated by the data processing system comprises a strain in the riser. In certain embodiments, the method further comprises calibrating the estimation provided by the data processing system using measurements provided by a second sensor assembly coupled to the subsea stack system, wherein the second sensor assembly is configured to measure at least one of a vibration, an inclination, and a strain in the subsea stack system, or at least one of a vibration, an inclination, and a strain in a lower end of the riser. In certain embodiments, the method further comprises measuring one or more environmental conditions in the environment surrounding the well system, wherein the environmental conditions comprises at least one of a heave of a surface vessel, a wind velocity, wave velocity, and a sea current velocity, and measuring a strain in a lower end of the riser using a second sensor assembly coupled to the subsea stack system. In some embodiments, the method further comprises using the data processing system to estimate the condition of the riser based on the measurements provided by the first sensor assembly and the second sensor assembly, wherein the condition of the riser comprises a strain in the riser, and issuing an alarm in response to the measured environmental conditions and the strain in the riser, as estimated by the data processing system, surpassing a first predetermined degree of strain. In some embodiments, the method further comprises using the data processing system to estimate the condition of the riser based on the measurements provided by the first sensor assembly and the second sensor assembly, wherein the condition of the riser comprises a strain in the riser, and adjusting a heading or speed of the surface vessel or disconnecting the riser from the subsea stack system in response to the measured environmental conditions and the strain in the riser, as estimated by the data processing system, surpassing a second predetermined degree of strain. In certain embodiments, the method further comprises coupling the first sensor assembly to an outer barrel of a telescopic joint, wherein the telescopic joint is coupled to the riser, and wherein the telescopic joint comprises an inner barrel permitted to move longitudinally relative to the outer barrel.

An embodiment of a system for monitoring a condition of a component of a well system located proximate to a seabed comprises a first sensor assembly to couple to a telescopic joint coupled to an upper end of a riser, wherein the first sensor assembly is configured to measure at least one of a vibration, an inclination, and a strain in the riser, and a data processing system in signal communication with the first sensor assembly, wherein the data processing system is configured to estimate the condition of a subsea stack system based on measurements provided by the first sensor assembly. In some embodiments, fatigue accumulated by components of the offshore well system may be monitored and corrective actions may be taken, such as the replacement of components.

Embodiments described herein comprise a combination of features and characteristics intended to address various shortcomings associated with certain prior devices, systems, and methods. The foregoing has outlined rather broadly the features and technical characteristics of the disclosed embodiments in order that the detailed description that follows may be better understood. The various characteristics and features described above, as well as others, will be readily apparent to those skilled in the art upon reading the following detailed description, and by referring to the accompanying drawings. It should be appreciated that the conception and the specific embodiments disclosed may be readily utilized as a basis for modifying or designing other structures for carrying out the same purposes as the disclosed embodiments. It should also be realized that such equivalent constructions do not depart from the spirit and scope of the principles disclosed herein.

BRIEF DESCRIPTION OF THE DRAWINGS

A description of various exemplary embodiments, reference will now be made to the accompanying drawings in which.

DESCRIPTION

The following discussion is directed to various exemplary embodiments. However, one skilled in the art will understand that the examples disclosed herein have broad application, and that the discussion of any embodiment is meant only to be exemplary of that embodiment, and not intended to suggest that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples"

is intended to mean either an indirect or direct connection. Thus, if a first device couples to a second device, that connection may be through a direct connection of the two devices, or through an indirect connection that is established via other devices, components, nodes, and connections. In addition, as used herein, the terms "axial" and "axially" generally mean along or parallel to a particular axis (e.g., central axis of a body or a port), while the terms "radial" and "radially" generally mean perpendicular to a particular axis. For instance, an axial distance refers to a distance measured along or parallel to the axis, and a radial distance means a distance measured perpendicular to the axis. Any reference to up or down in the description and the claims is made for purposes of clarity, with "up", "upper", "upwardly", "uphole", or "upstream" meaning toward the surface of the borehole and with "down", "lower", "downwardly", "downhole", or "downstream" meaning toward the terminal end of the borehole, regardless of the borehole orientation. As used herein, the terms "approximately," "about," "substantially," and the like mean within 10% (i.e., plus or minus 10%) of the recited value. Thus, for example, a recited angle of "about 80 degrees" refers to an angle ranging from 72 degrees to 88 degrees.

Figure 1:
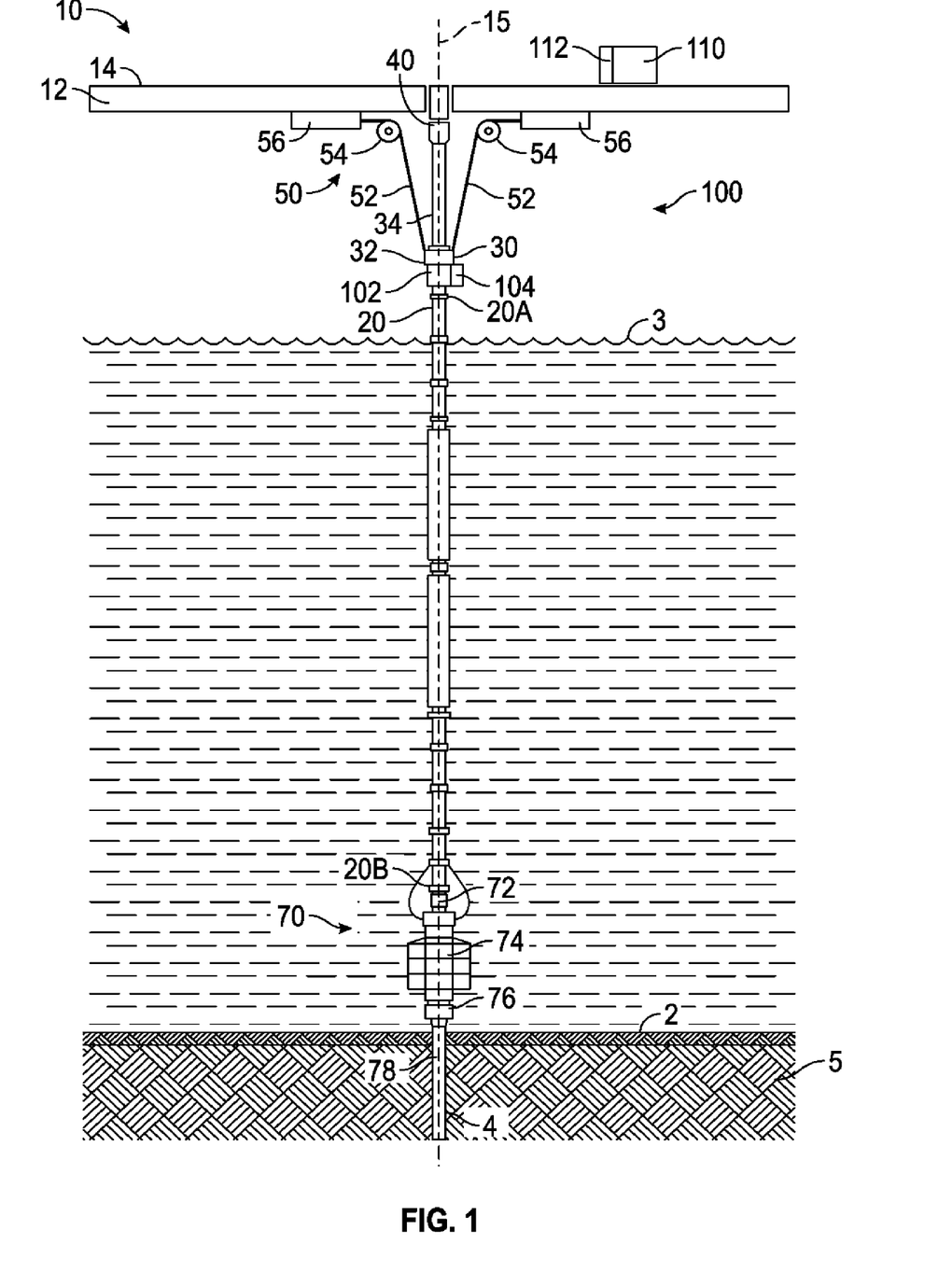
FIG. 1 is a schematic view of an offshore well system including an embodiment of a system for monitoring a condition of a component of the well system located proximate to the seabed.
Figure 2:
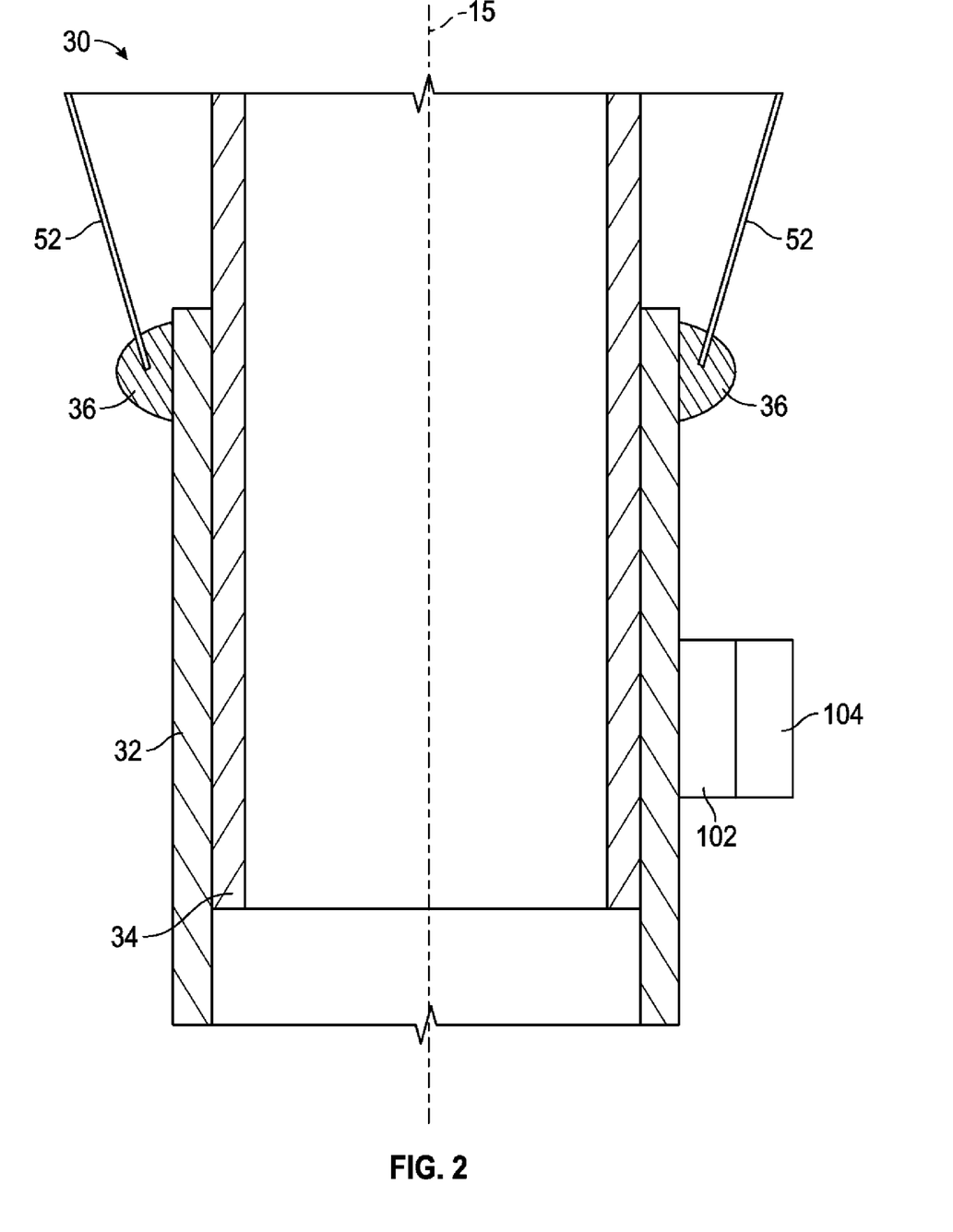
FIG. 2 is an enlarged schematic cross-sectional view of the telescopic joint of the well system of FIG. 1.

Referring to FIGS. 1 and 2, an embodiment of a system 100 for monitoring a condition of a component of an offshore well system 10 is shown. In particular, system 100 monitors a component of well system 10 disposed at or proximate a seabed 2 in this embodiment. Well system 10 is used to drill a wellbore 4 extending from seabed 2 through an earthen formation 5. In this embodiment, well system 10 has a central or longitudinal axis 15 and generally includes a surface vessel 12 with a support structure or floor 14 disposed above a waterline 3, a subsea stack system 70 disposed at the upper end of wellbore 4 proximate the seabed 2, and a riser 20 extending from stack 70 to vessel 12. In particular, riser 20 has a first or upper end 20A coupled to surface vessel 12 with a telescopic joint 30, and a second or lower end 20B coupled to subsea stack system 70. In other embodiments, telescopic joint 30 may comprise a slip joint or a tension joint. In general, surface vessel 12 can be any offshore production platform or vessel including a drill ship, a semi-submersible platform, a tension leg platform, a spar platform, etc.

As best shown in FIG. 2, telescopic joint 30 includes a first or outer barrel 32 and a second or inner barrel 34 slidably received in outer barrel 32. In this embodiment, the upper end 20A of riser 20 is coupled to outer barrel 32 of telescopic joint 30, while inner barrel 34 is coupled to surface vessel 12 via a first or upper flex joint 40 (FIG. 1) that permits relative angular movement between inner barrel 34 and surface vessel 12. Thus, upper flex joint 40 permits limited angular movement between riser 20 and surface vessel 12 (e.g., pivoting of surface vessel 12 relative to central axis 15). Outer barrel 32 and inner barrel 34 of telescopic joint 30 can move axially relative to each other, thereby permitting limited axial movement between riser 20 and surface vessel 12 to account for heave of surface vessel 12 (e.g., axial displacement of surface vessel 12 relative to the seabed 2 resulting from changes in the position of waterline 3, etc.).

Referring now to FIGS. 1 and 2, well system 10 also includes a tensioning system 50 that applies an axially upward force to the upper end 20A of riser 20. In this embodiment, tensioning system 50 generally includes a plurality of tensioning cables 52, a plurality of sheaves 54 for directing cables 52, and one or more actuators 56 for controlling the amount of tension in cables 52 and corresponding vertical force applied to riser 20 with cables 52. In other embodiments, tensioning system 50 may include tensioning rods instead of tensioning cables 52. In this embodiment, actuators 56 are hydraulic cylinders. As shown in FIG. 2, the lower end of each tensioning cable 52 is coupled to the outer barrel 32 of telescopic joint 30 at an attachment point or anchor 36. As will be described in more detail below, the amount of tension applied to tensioning cables 52 with actuators 56 may be changed in response to changing conditions in the environment surrounding well system 10 and/or changes in conditions of one or more components of well system 10.

Referring again to FIG. 1, in this embodiment of well system 10, subsea stack system 70 includes a second or lower flex joint 72 coupled to the lower end 20B of riser 20, a blowout preventer (BOP) stack 74, a wellhead conductor 76 disposed at the seabed 2, and a tubular conductor casing 78 extending from wellhead conductor 76 into the wellbore 4. Conductor casing 78 is cemented in place with the wellbore 4 and provides structural support to wellbore 4. BOP stack 74 is coupled with wellhead conductor 76 and includes a plurality of BOPs, such as ram and/or annular BOPs, configured to selectively isolate wellbore 4. Lower flex joint 72 couples riser 20 with subsea stack system 70 while permitting limited angular movement between riser 20 and subsea stack system 70 (e.g., pivoting of riser 20 relative to central axis 15).

Riser 20 of well system 10 is tubular conduit through which a drillstring (not shown) may be extended and inserted into wellbore 4 for drilling into formation 5 via a drill bit attached to a lower end of the drillstring. The annulus formed between an inner surface of the riser and an outer surface of the drillstring extending therethrough provides a flow path for circulating drilling fluids pumped down the drillstring and out the face of the drill bit back to the surface vessel 12. In this embodiment, riser 20 is a marine drilling riser, however, in other embodiments, the riser (e.g., riser 20) may be a production riser, a catenary riser, or other tubular systems.

Referring again to FIGS. 1, 2, system 100 monitors a condition of a component of well system 10. In this embodiment, monitoring system 100 includes a first sensor assembly 102 positioned above waterline 3 and a data processing system 110 supported by surface vessel 12. First sensor assembly 120 is coupled to telescopic joint 30, and in particular, as shown in FIG. 2, first sensor assembly 102 is mounted to the outer barrel 32 of telescopic joint 30. First sensor assembly 102 measures at least one of a vibration, an inclination, and a strain in riser 20. In this embodiment, first sensor assembly 102 includes a vibration sensor, an inclination sensor, and a strain gauge. In addition, first sensor assembly 102 includes a data logger (e.g., a memory) that receives and stores measurement provided by first sensor assembly 102. Although first sensor assembly 102 is mounted to outer barrel 32 of telescopic joint 30 in this embodiment, in other embodiments, the sensor assembly (e.g., first sensor assembly 102) may be located at other locations along riser 20 above the waterline 3.

Monitoring system 100 also includes an electronic wireless transmitter 104 that wirelessly transmits and communicates measurements provided by the first sensor assembly 102 to data processing system 110. In some embodiments, wireless transmitter 104 communicates signals from first sensor assembly 102 to data processing system 110 across a wireless local area network (WLAN). In this embodiment, wireless transmitter 104 is coupled to first sensor assembly 102 at the telescopic joint 30. However, in other embodiments, wireless transmitter 104 may be located separately from first sensor assembly 102, with a wired connection formed therebetween to permit signal communication between first sensor assembly 102 and wireless transmitter 104. In other embodiments, monitoring system 100 may not include wireless transmitter 104, and instead a wired electrical connection may be provided directly between first sensor assembly 102 and wireless transmitter 104.

Components of well system 10 are exposed to forces from the surrounding environment. For instance, axially directed heave motion of surface vessel 12 may apply tension (heave motion of surface vessel 12 away from seabed 2) and compressive (heave motion of surface vessel 12 towards seabed 2) forces to riser 20 and subsea stack system 70 despite the relative axial movement permitted by telescopic joint 30. In addition, waves at the surface 3 may cause movement of the vessel 12 and riser 20, and subsea currents below the surface 3 may generate vortex induced vibration (VIV) in riser 20 and subsea stack system 70, thereby inducing fatigue in riser 20 and subsea stack system 70, including wellhead conductor 76. In some applications, fatigue accrued by riser 20 and subsea stack system 70 may occur and limit useful life of riser 20 and components of subsea stack system 70, including wellhead conductor 76. For example, VIV occurring in riser 20 from the motion of underwater currents flowing past riser 20 may be transmitted to wellhead conductor 76 and conductor casing 78, potentially causing fatigue to wellhead conductor 76 and conductor casing 78. Given the structural support wellhead conductor 76 and conductor casing 78 provide to wellbore 4, as well as riser 20, it may be generally preferred to prevent wellhead conductor 76 and/or conductor casing 78 from receiving this fatigue. Further, tension, compression, bending, and VIV applied to riser 20 may ecrease the useful life of riser 20 resulting in higher operating cost of well system 10.

In view of the risks associated by exposing components of well system 10 to excessive fatigue rates and potentially fatigue to riser 20 and subsea stack system 70, monitoring system 100 measures fatigue in the components of well system 10 and provides access to the measured fatigue such that remedial or corrective actions may be taken in real time or near-real time to reduce the fatigue rate experienced by the monitored components of well system 10. In this embodiment, an accelerometer of first sensor assembly 102 measures vibration (e.g., vibration frequency over time) of outer barrel 32 of telescopic joint 30. Additionally, in this embodiment, an inclinometer of first sensor assembly 102 measures the angular amplitude of the vibration of outer barrel 32. The vibration frequency and angular amplitude of outer barrel 32 measured by first sensor assembly 102 is continuously transmitted to data processing system 110 in real time using wireless transmitter 104. In this embodiment, data processing system 110 includes a fatigue model stored on a memory of system 110 that estimates a fatigue rate of subsea stack system 70, including conductor casing 78, based on the vibration and angular amplitude of outer barrel 32 measured by first sensor assembly 102 and data describing the geometry of riser 20 and conductor casing 78 stored on the memory of data processing system 110. In some embodiments, the geometry data pertaining to riser 20 and conductor casing 78 stored in the memory of data processing system 110 includes axial lengths, outer diameters, and inner diameters of the riser 20 and conductor casing 78.

In some embodiments, the fatigue model estimates fatigue using one or more S-N curves corresponding to components of subsea stack system 70. An S-N curve plots a stress range (S) against a number of cycles to failure (N), where the amount of fatigue represents a percentage (e.g., a percentage of N cycles to failure) of the component's total fatigue capacity, and the fatigue rate represents the rate of increase of the component's fatigue. In some embodiments, the fatigue model uses a rainflow-counting algorithm in conjunction with the S-N curve to estimate the component's fatigue. Additionally, in certain embodiments, the fatigue model estimates the component's fatigue by estimating a stress concentration factor of the component and a motion-stress relationship between the component and the location of first sensor assembly 102. In certain embodiments, the component's stress concentration factor and the motion-stress relationship may be estimated using finite element analysis (FEA). Further, in some embodiments, the fatigue model may use a commercially available software package for estimating fatigue, such as Flexcom produced by the Wood Group of Abardeen, Scotland, Orcaflex, including the Shear7 application, produced by Orcina Ltd. of Ulverston, United Kingdom, and Abaqus produced by Dassault Systemes of Velizy-Villacoublay, France. Thus, in this embodiment, the fatigue model of data processing system 110 is configured to determine or estimate the fatigue rate of conductor casing 78 from known geometry information pertaining to riser 20 and conductor casing 78 in connection with measured vibration and angular amplitude data captured at telescopic joint 30. In other embodiments, the fatigue model of data processing system 110 determines or estimates fatigue rates for riser 20 and other components of subsea stack system 70, including wellhead conductor 76, based off of their respective geometry data and the vibration and angular amplitude data captured telescopic joint 30 by first sensor assembly 102. Additionally, in this embodiment, data processing system 110 is configured to display, in real time, the estimated fatigue rate of conductor casing 78 using a display 112 of data processing system 110. In this manner, the fatigue rate of conductor casing 78, as estimated by the fatigue model of data processing system 110, may be accessed in real time by personnel of well system 10. In other embodiments, data processing system 110 includes wireless signal transmitter for transmitting the estimated fatigue rate of conductor casing 78 to locations remote from well system 10 (e.g., via a satellite uplink, etc.).

In this embodiment, having access in real time to the estimated fatigue rate of conductor casing 78, personnel of well system 10 may take corrective or remedial actions in near-real time to reduce the fatigue rate of conductor casing 78 in the event that the fatigue rate exceeds a predetermined or action rate. For example, in response to the fatigue rate of conductor casing 78 exceeding the action rate, personnel of well system 10 may, in near-real time, adjust the tension applied to riser 20 by the tensioning cables 52 of tensioning system 50 to thereby reduce the fatigue rate of conductor casing 78 to an acceptable level. Additionally, personnel of well system 10 may adjust the relative position between surface vessel 12 and riser 20 (e.g., by adjusting a heading and/or speed of surface vessel 12) to reduce the fatigue rate of conductor casing 78 to an acceptable level. Additionally, in some embodiments, data processing system 110 is configured to automatically produce an alarm notifying personnel of well system 10 in the event that the fatigue rate of conductor casing 78 exceeds a predetermined or alarm rate that is less than or equal to the action rate.

In this embodiment, the continuous and real time measurement of vibration and angular amplitude at telescopic joint 30 by first sensor assembly 102, the real time transmission of the measured data to data processing system 110 via wireless transmitter 104, and the continuous and real time estimation of the fatigue rate of conductor casing 78 by system 110 enables personnel of well system 10 to take corrective action in near-real time to reduce the fatigue rate of conductor casing 78, thereby reducing the risk of failure of conductor casing 78, and optimizing the fatigue life of conductor casing 78, as well as riser 20 and other components of subsea stack system 70. Particularly, the fatigue model of data processing system 110 provides for the estimation of the fatigue rate of conductor casing 78 without requiring vibration and/or angular amplitude data captured directly from subsea stack system 70 (e.g., via a sensor assembly coupled to subsea stack system 70), where subsea stack system 70, being disposed proximal to seabed 2, is located at a position preventing wireless electronic transmission of data captured therefrom to data processing system 110.

Still referring to FIGS. 1, 2, as described above, in this embodiment, first sensor assembly 102 of monitoring system 100 also includes a strain gauge for measuring strain in riser 20. More specifically, the strain gauge of first sensor assembly 102 measures strain in outer barrel 32 as it is mounted to outer barrel 32 of telescopic joint 30. The upper end 20A of riser 20 is fixably coupled to outer barrel 32 such that relative axial movement is prevented between riser 20 and outer barrel 32, and thus, the strain in outer barrel 32 measured by first sensor assembly 102 indicates or corresponds to strain in riser 20 at upper end 20A. Further, changes in the strain of riser 20, as measured by first sensor assembly 102, indicate the application of tensile forces (e.g., tensile strain) or compressive forces (e.g., compressive strain) in riser 20.

In this embodiment, first sensor assembly 102 continuously and in real time, measures the amount of tension applied to riser 20 at upper end 20A. As described above, although relative axial movement is permitted between inner barrel 34 and outer barrel 32 of telescopic joint 30, tensile forces may still be applied by surface vessel 12 to the upper end 20A of riser 20. For example, heave movement of waterline 5 may result in a rapid change in axial position of surface vessel 12 relative to the upper end 20A of riser 20. The measured tension in riser 20 is then continuously transmitted in real time to data processing system 110 via wireless transmitter 104. In some embodiments, the tension data received by data processing system 110 is displayed in real time to personnel of well system 10 via display 112.

In some embodiments, data processing system 110 outputs an alarm to notify personnel of well system 10 in response to a measured tension force applied to upper end 20A of riser 20 exceeding a predetermined or alarm value, where the alarm value exceeds a first predetermined degree of strain. Given that the measured tension applied to the upper end 20A of riser 20 is provided continuously and in real time to personnel of well system 10 via data processing system 110, personnel of well system 10 may take remedial or corrective actions in near-real time to reduce the amount of tension applied to riser 20 when the tension exceeds a predetermined or action value, where the action value exceeds a second predetermined degree of strain that is greater than the first predetermined degree of strain. For example, personnel of well system 10 may reduce the tension applied to riser 20 by the tensioning cables 52 of tensioning system 50. Additionally, personnel of well system 10 may adjust the relative position between surface vessel 12 and riser 20 to reduce the amount of tension applied to riser 20. Further, personnel of well system 10 may also unlatch the lower end 20B of riser 20 from subsea stack system 70 to permit relative axial movement between riser 20 and subsea stack system 70. In this manner, corrective actions may be taken in near-real time to reduce the amount of tension applied to riser 20 when the amount of tension exceeds the action value, reducing the amount of fatigue accrued by riser 20 and thereby optimizing the fatigue life of riser 20.

Figure 3:
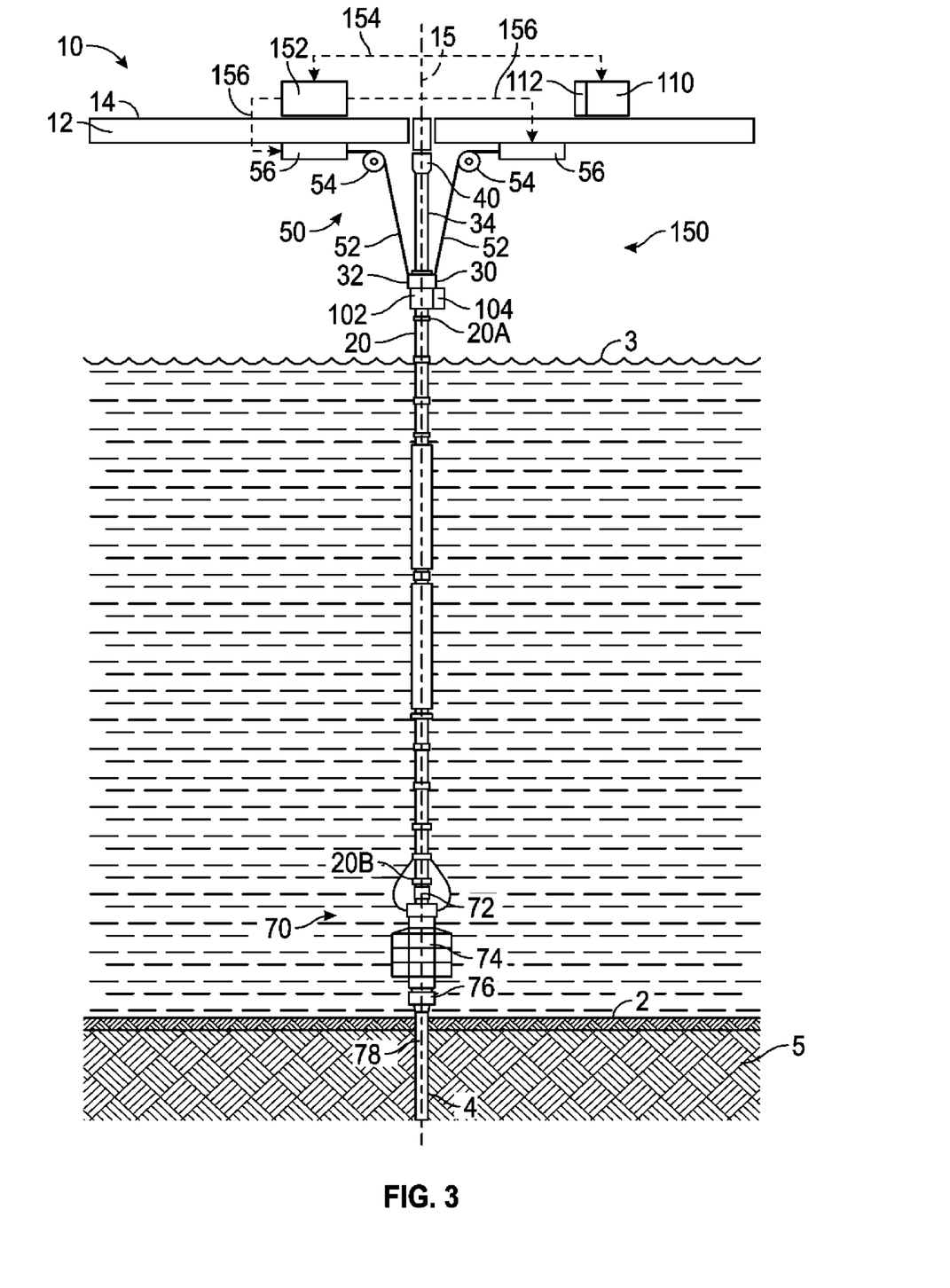
FIG. 3 is a schematic view of an embodiment of a system for monitoring a condition of a component of the well system of FIG. 1 located proximate to the seabed.

Referring to FIG. 3, another embodiment of a system 150 for monitoring a condition of a component of well system 10 is shown. Monitoring system 150 includes features in common with monitoring system 100 shown in FIGS. 1, 2, and shared features are labeled similarly. In the embodiment of FIG. 3, monitoring system 150 generally includes first sensor assembly 102, wireless transmitter 104, data processing system 110, and a control system 152 supported by surface vessel 12. Control system 152 is in signal communication with both data processing system 110 (indicated schematically by signal link 154) and each actuator 56 of tensioning system 50 (indicated schematically by signal links 156). In this embodiment, signal links 154, 156, comprise electrical cables that form a hardwired connection between control system 152 and the data processing system 110 and actuators 56; however, in other embodiments, electronic wireless transmitters may be used to communicate signals and/or data between control system 152 and the data processing system 110 and actuators 56.

Control system 152 automatically controls actuators 56 of tensioning system 50 to adjust the amount of tension applied to riser 20 from the tensioning cables 52 of tensioning system 50 in response to the fatigue rate (e.g., estimated fatigue rate of conductor casing 78) and/or measured tension in riser 20 provided by data processing system 110 and first sensor assembly 102. Thus, unlike the embodiment of monitoring system 100 shown in FIGS. 1, 2, control system 150 automatically and in real time adjust the amount of tension applied to riser 20 by tensioning system 50 to thereby reduce the fatigue rate of conductor casing 78 and/or the tension applied to the upper end 20A of riser 20 from surface vessel 12. In this embodiment, control system 150 adjusts the amount of tension applied to riser 20 within a response time between five and fifteen minutes following the fatigue rate of conductor casing 78 exceeding the action rate and/or the tension applied to riser 20 from surface vessel 12 exceeding the action value; however, in other embodiments, the response time of control system 150 may vary.

In this embodiment, control system 152 includes memory for storing the fatigue action rate of conductor casing 78 and the action value of tension applied to riser 20 described above. Control system 152 automatically controls actuators 56 to adjust tension in the tensioning cables 52 in response to the fatigue rate of conductor casing 78 exceeding the action rate and/or the tension applied to riser 20 exceeding the action value. In embodiments where the fatigue model of data processing system 110 estimates fatigue rates of additional components of well system 10 (e.g., riser 20, wellhead conductor 76, etc.), control system 152 may also automatically control actuators 56 of tensioning system 50 in response to the estimated fatigue rates of those additional components exceeding the predetermined, threshold values associated with each component. Thus, control system 150 automatically provides continuous and real time optimization of the fatigue life of various components of well system 10, including riser 20 and the conductor casing 78 of subsea stack system 70.

Figure 4:
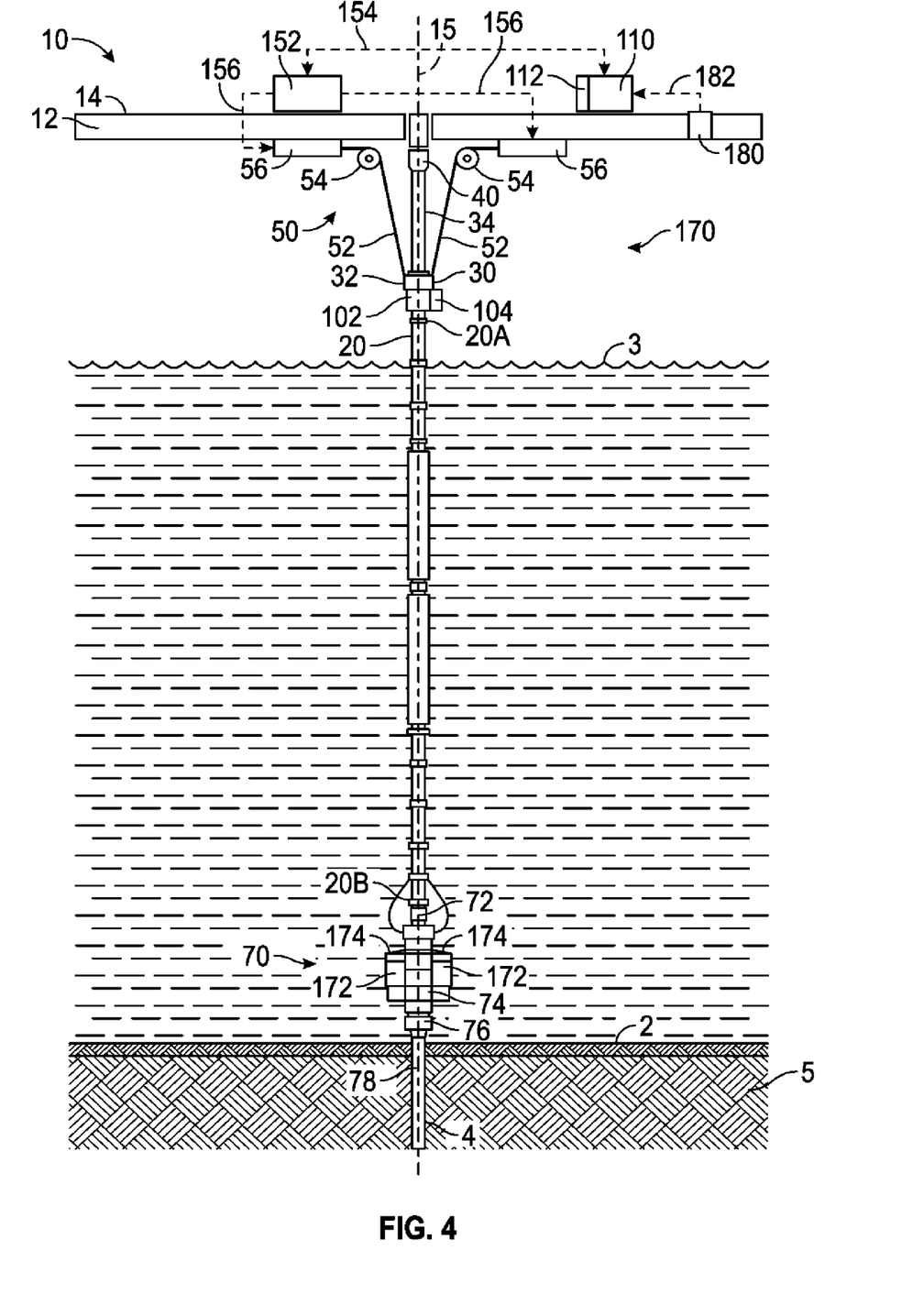
FIG. 4 is a schematic view of an embodiment of a system for monitoring a condition of a component of the well system of FIG. 1 located proximate to the seabed.

Referring to FIG. 4, another embodiment of a system 170 for monitoring a condition of a component of well system 10 is shown. Monitoring system 170 includes features in common with monitoring system 150 shown in FIG. 3, and shared features are labeled similarly. In the embodiment of FIG. 4, monitoring system 170 generally includes a plurality of second sensor assemblies 172 located at subsea stack system 70, and a third sensor assembly 180 located at surface vessel 12 in addition to the components of control system 150 shown in FIG. 3. Second sensor assemblies 172 are configured to measure at least one of a vibration, an inclination, and a strain in subsea stack system 70. In this embodiment, each second sensor assembly 172 comprises a vibration sensor, an inclination sensor, and a strain gauge. Additionally, each second sensor assembly 172 also comprises a data logger (e.g., a memory).

In this embodiment, monitoring system 170 also includes a plurality of acoustic transmitters 174 located at subsea stack system 70 and in signal communication with second sensor assemblies 172. Acoustic transmitters 174 transmit acoustic signals representative of measurements provided by second sensor assemblies 172 from the second sensor assemblies 172 to data processing system 110. In other embodiments, one or more electrical cables (e.g., a MUX cable, separate cables, etc.) may extend between second sensor assemblies 172 and data processing system 110 to provide a hardwired connection therebetween. Particularly, subsea acoustic telemetry, such as that provided by acoustic transmitters 174, may interfere with other acoustic telemetry systems employed by well system 10. In other words, acoustic telemetry has a limited bandwidth relative to wireless electronic telemetry systems (e.g., wireless transmitter 104, etc.), and employing acoustic telemetry for transmitting signals from second sensor assemblies 172 may inhibit the operation of other telemetry systems of well system 10. However, wired systems, particularly wired systems extending between a surface vessel (e.g., surface vessel 12) and a component located proximate to a seabed (e.g., subsea stack system 70), may increase the costs of deploying well system 10. Thus, in still other embodiments, each second sensor assembly 172 may include a memory module that is retrievable by a remotely operated underwater vehicle (ROV). However, although a retrievable system may reduce the costs of deploying well system 10, retrievable systems do not allow for real time communication of measured data with data processing system 110, as the retrievable memory modules of second sensor assemblies 172 may only be collected periodically.

Second sensor assemblies 172, being mounted to subsea stack system 70, may directly measure vibration (e.g., vibration frequency over time) and the angular amplitude of vibration of wellhead connector 76 and conductor casing 78. Additionally, the location of second sensor assemblies 172 below riser 20 allows assemblies 172 to continuously and in real time measure and transmit (via acoustic transmitters 174) the amount of compression in riser 20 at lower end 20B. As described above, downward axial movement of surface vessel 12 may apply compressive forces against riser 20. These compressive forces are transferred along the axial length of riser 20, compressing the lower end 20B of riser against subsea stack system 70 at the flex joint 72. Thus, second sensor assemblies 172 (located below lower end 20B of riser 20) are better positioned to measure maximum compression in riser 20 than first sensor assembly 104 (located proximate to the upper end 20A of riser 20).

Third sensor assembly 180 of monitoring system 170 measures conditions in the surrounding environment, including wind and wave velocity, the heading and heave movement of surface vessel 12, and the velocity of subsea currents. Third sensor assembly 180 is in signal communication with data processing system 110 (indicated schematically by signal link 182). In this embodiment, signal link 182 comprises one or more electrical cables that form a hardwired connection between third sensor assembly 180 and data processing system 110; however, in other embodiments, an electronic wireless transmitter may be used to provide signal communication between third sensor assembly 180 and data processing system 110.

In this embodiment, data processing system 110 of monitoring system 170 utilizes data provided by second sensor assemblies 172 to calibrate its fatigue model to thereby increase the accuracy of its estimation of the fatigue rate of casing conductor 76. In some embodiments, data processing system 110 compares the vibration and angular amplitude data provided by first sensor assembly 102 with the vibration and angular amplitude data provided by second sensor assemblies 172 to calculate a correction factor or variable that may be applied to the data provided by first sensor assembly 102 to produce a more accurate estimate of the fatigue rate of conductor casing 78. In other embodiments, data processing system 110 compares a first estimated fatigue rate of conductor casing 78 calculated from data provided by first sensor assembly 102 with a second estimated fatigue rate of conductor casing 78 calculated from data provided by second sensor assemblies 172 to provide a correction factor or variable that may be used to increase the accuracy of the first estimated fatigue rate. In some embodiments, data processing system 110 calibrates fatigue model once (e.g., during initialization of monitoring system 170) or a limited number times (e.g., at fixed or predetermined intervals). Thus, in embodiments where second sensor assemblies 172 are not used to provide continuous and real time measurements of compression in the lower end 20B of riser 20, second sensor assemblies 172 may be configured with retrievable memory modules to increase the amount of acoustic bandwidth available to well system 10 for other telemetry operations.

As described above, in this embodiment, second sensor assemblies 172 continuously and in real time measure the amount of compression applied to riser 20 at lower end 20B. In some embodiments, the compression data received by data processing system 110 from second sensor assemblies 172 is displayed in real time to personnel of well system 10 via display 112 of data processing system 110. In some embodiments, data processing system 110 outputs an alarm to notify personnel of well system 10 in response to a measured compression force at lower end 20B of riser 20 exceeding a predetermined or alarm value, where the alarm value exceeds a first predetermined degree of strain. Given that the measured compression at lower end 20B of riser 20 is provided continuously and in real time to personnel of well system 10 via data processing system 110, personnel of well system 10 may take remedial or corrective actions in near-real time to reduce the amount of compression applied to riser 20 when the compression exceeds a predetermined or action value, where the action value exceeds a second predetermined degree of strain that is greater than the first predetermined degree of strain. For example, personnel of well system 10 may reduce compression in riser 20 by increasing the amount of tension applied to riser 20 by the tensioning cables 52 of tensioning system 50. Additionally, personnel of well system 10 may adjust the relative position between surface vessel 12 and riser 20 to reduce the amount of compression applied to riser 20. Further, personnel of well system 10 may also unlatch the lower end 20B of riser 20 from subsea stack system 70 to permit relative axial movement between riser 20 and subsea stack system 70.

Similarly, in some embodiments, the environmental condition data received by data processing system 110 from third sensor assembly 180 is displayed in real time to personnel of well system 10 via display 112 of data processing system 110, and data processing system 110 may also output an alarm to notify personnel of well system 10 in response to one or more of the measured environmental conditions exceeding a predetermined or alarm value. Further, personnel of well system 10 may take remedial or corrective actions (e.g., adjust tensioning system 50, adjust the position of surface vessel 12, and/or unlatch riser 20 from subsea stack system 70, etc.) in near-real time when one or more of the measured environmental conditions exceed a predetermined or action value. In some embodiments, the action value of each measured environmental condition varies in response to changes in tension/compression in riser 20 and changes in the fatigue rate of riser 20 and/or components of subsea stack system 70. For instance, the respective action values of the measured environmental conditions may decrease when riser 20 is experiencing an elevated degree of tension or compression, and when riser 20 or components of subsea stack system 70 are exposed to an elevated fatigue rate.

In this embodiment, in response to a measured compression force of riser 20 exceeding the action value, control system 150 automatically, and in real time, control the actuators 56 to increase the tension applied to riser 20 from tensioning cables 52. Additionally, control system 150 automatically, and in real time, controls actuators 56 to adjust the tension applied to riser 20 in response to the environmental conditions, as measured by third sensor assembly 180, exceeding their respective action values, including whether the action values are fixed or varying in response to changes in tension/compression of riser 20 and changes in the fatigue rate of riser 20 and/or components of subsea stack system 70). In this embodiment, control system 150 is configured to adjust the amount of tension applied to riser 20 within a response time between five and fifteen minutes following the compression applied to riser 20 exceeding the action value and/or the environmental conditions exceeding their respective action values; however, in other embodiments, the response time of control system 150 may vary.

While exemplary embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A system for monitoring a condition of a component of a well system located proximate to a seabed, comprising:
    a surface vessel;
    a riser including an upper end coupled to the surface vessel and a lower end coupled to a subsea stack system;
    a telescopic joint coupled to the riser proximal the upper end of the riser;
    a first sensor assembly coupled to the telescopic joint, wherein the first sensor assembly is configured to measure at least one of a vibration, an inclination, and a strain in the riser; and
    a data processing system in signal communication with the first sensor assembly, wherein the data processing system is configured to estimate the condition of the subsea stack system based on measurements provided by the first sensor assembly.

2. The system of claim 1, wherein the first sensor assembly is located above a waterline.

3. The system of claim 1, wherein the telescopic joint comprises:
    an inner barrel slidably disposed in an outer barrel, wherein the first sensor assembly is coupled to the outer barrel;
    wherein relative longitudinal movement between the outer barrel and the riser is restricted while relative longitudinal movement between the inner barrel and the riser is permitted;
    wherein the first sensor assembly is configured to measure a strain in the outer barrel.

4. The system of claim 1, further comprising:
    a vessel sensor assembly configured to measure one or more environmental conditions in the environment surrounding the well system, wherein the vessel sensor assembly is in signal communication with the data processing system, wherein the environmental conditions comprises at least one of a heave of the surface vessel, a wind velocity, a wave velocity, and a sea current velocity;
    a tensioning system coupled to the surface vessel and the riser, wherein the tensioning system is configured to apply an adjustable amount of tension to the riser; and
    a control system in signal communication with the data processing system, wherein the control system is configured to adjust the amount of tension applied to the riser from the tensioning system based on the environmental conditions measured by the vessel sensor assembly or the condition of the subsea stack system estimated by the data processing system.

5. The system of claim 1, wherein the condition of the subsea stack system comprises a fatigue of the subsea stack system.

6. The system of 1, further comprising a wireless transmitter configured to wirelessly transmit electromagnetic signals representative of measurements provided by the first sensor assembly between the first sensor assembly and the data processing system.

7. The system of claim 1, wherein the first sensor assembly comprises an accelerometer, an inclinometer, and a strain gauge.

8. The system of claim 1, wherein the subsea stack system is coupled to the lower end of the riser by a flex joint.

9. A system for monitoring a condition of a component of a well system located proximate to a seabed, comprising:
    a surface vessel;
    a riser including an upper end coupled to the surface vessel and a lower end coupled to a subsea stack system;

a first sensor assembly coupled to the riser, wherein the first sensor assembly is configured to measure at least one of a vibration, an inclination, and a strain in the riser;

a data processing system positioned on the surface vessel and in signal communication with the first sensor assembly, wherein the data processing system is configured to estimate the condition of the subsea stack system based on measurements provided by the first sensor assembly; and a wireless transmitter configured to wirelessly transmit electromagnetic signals representative of measurements provided by the first sensor assembly between the first sensor assembly coupled to the riser and the data processing system positioned on the surface vessel.

10. The system of claim 9, wherein the wireless transmitter is configured to communicate signals between the first sensor assembly and the data processing system across a wireless local area network.

11. The system of claim 9, further comprising:
a second sensor assembly coupled to the subsea stack system and in signal communication with the data processing system, wherein the second sensor assembly is configured to measure a strain in the lower end of the riser;
a tensioning system coupled to the riser, wherein the tensioning system is configured to apply an adjustable amount of tension to the riser; and
a control system in signal communication with the data processing system, wherein the control system is configured to adjust, within a response time between five and fifteen minutes, the amount of tension applied to the riser by the tensioning system based on the strain in the riser as estimated by the data processing system
wherein the data processing system is configured to estimate a strain in the riser based on the measurements provided by the first sensor assembly and measurements provided by the second sensor assembly.

12. The system of claim 11, wherein the data processing system is configured to calibrate the estimation provided by the data processing system using the measurements provided by the second sensor assembly.

13. The system of claim 9, further comprising a telescopic joint coupled to the upper end of the riser, wherein the first sensor assembly is coupled to the telescopic joint.

14. The system of claim 9, wherein the first sensor assembly comprises an accelerometer, an inclinometer, and a strain gauge.

15. The system of claim 9, wherein the first sensor assembly comprises a data logger configured to store the measurements provided by the first sensor assembly.

16. The system of claim 9, wherein the first sensor assembly is located above a waterline.

17. A method for monitoring a condition of a component of a well system located proximate to a seabed, comprising:
measuring at least one of a vibration, an inclination, and a strain in a riser using a first sensor assembly coupled to the riser;
wirelessly transmitting electromagnetic signals representative of measurements provided by the first sensor assembly between the first sensor assembly coupled to the riser and a data processing system positioned on a surface vessel; and
using the data processing system to estimate the condition of a subsea stack system based on measurements provided by the first sensor assembly.

18. The method of claim 17, further comprising:
using the data processing system to estimate the condition of the riser based on the measurements provided by the first sensor assembly; and
adjusting, within a response time between five and fifteen minutes, a tension applied to the riser from a tensioning system coupled to the riser in response to the estimated condition of the riser, wherein the condition of the riser estimated by the data processing system comprises a strain in the riser.

19. The method of claim 17, further comprising calibrating the estimation provided by the data processing system using measurements provided by a second sensor assembly coupled to the subsea stack system, wherein the second sensor assembly is configured to measure at least one of a vibration, an inclination, and a strain in the subsea stack system, or at least one of a vibration, an inclination, and a strain in a lower end of the riser.

20. The method of claim 17, further comprising:
measuring one or more environmental conditions in the environment surrounding the well system, wherein the environmental conditions comprises at least one of a heave of the surface vessel, a wind velocity, wave velocity, and a sea current velocity;
measuring a strain in a lower end of the riser using a second sensor assembly coupled to the subsea stack system;
using the data processing system to estimate the condition of the riser based on the measurements provided by the first sensor assembly and the second sensor assembly, wherein the condition of the riser comprises a strain in the riser; and
issuing an alarm in response to the measured environmental conditions and the strain in the riser, as estimated by the data processing system, surpassing a first predetermined degree of strain.

21. The method of claim 20, further comprising
adjusting a heading or speed of the surface vessel or disconnecting the riser from the subsea stack system in response to the measured environmental conditions and the strain in the riser, as estimated by the data processing system, surpassing a second predetermined degree of strain.

22. The method of claim 17, further comprising coupling the first sensor assembly to an outer barrel of a telescopic joint, wherein the telescopic joint is coupled to the riser, and wherein the telescopic joint comprises an inner barrel permitted to move longitudinally relative to the outer barrel.

23. The method of claim 17, wherein the first sensor assembly is located above a waterline.

* * * * *